United States Patent [19]

Barker et al.

[11] Patent Number: 5,092,963
[45] Date of Patent: Mar. 3, 1992

[54] AUTOMATED TOP HEAD AND STEM GUIDE ASSEMBLY FOR COKING DRUMS

[75] Inventors: Richard J. Barker, Diamond Bar, Calif.; Frank A. DiGiacomo, Morris Plains, N.J.; James M. Hardy, Garden Grove; Robert F. Lamm, Westminister, both of Calif.; Allen S. Malsbury, Parsippany, N.J.

[73] Assignee: Atlantic Richfield Company, Los Angeles, Calif.

[21] Appl. No.: 312,186

[22] Filed: Feb. 21, 1989

[51] Int. Cl.⁵ .................. C10B 1/04; C10B 43/02
[52] U.S. Cl. .................. 202/250; 134/177; 196/122; 196/133; 202/241; 220/211; 220/337
[58] Field of Search .......... 202/241, 246, 250, 262, 202/263; 134/167 R, 162, 175, 177, 180, 181, 192, 197, 200; 220/252, 259, 337, 211; 196/122, 133; 110/173 R; 48/87, 124; 49/402, 397, 399

[56] References Cited

U.S. PATENT DOCUMENTS

| | | | |
|---|---|---|---|
| 566,756 | 1/1896 | Harris | 48/124 |
| 2,245,554 | 6/1941 | Court | 134/24 |
| 2,585,417 | 2/1952 | Williams | 48/87 |
| 2,753,051 | 7/1956 | Tupper | 220/259 |
| 3,628,687 | 12/1971 | Townsend | 134/175 |
| 3,785,572 | 10/1976 | Petermann et al. | 134/167 R |

Primary Examiner—Joye L. Woodard
Attorney, Agent, or Firm—Marvin A. Naigur

[57] ABSTRACT

An automated top head cover and stem guide assembly adapted for covering a top opening in vertical vessels such as coking drums, and a method for remotely operating the assembly. The top head assembly includes a flanged connector unit attached pressure-tightly to a top flange opening of a coking drum, and a top cover device including a cover unit pivotally attached to the flanged connector unit, so that the top cover unit can be pivotally lifted and moved aside. A stem guide device is also pivotally attached to the flanged connector unit, so that a stem guide unit can be pivotally moved downwardly into place over the top flange unit opening, after a stem member is inserted into the vessel. Following coke removal from the drum, the stem member is withdrawn, the stem guide unit is pivotally moved upwardly, and the head cover unit is moved downwardly to cover the coking drum flanged connector unit. The invention also discloses method steps for operating the head cover and stem guide devices of the assembly.

12 Claims, 3 Drawing Sheets

AUTOMATED TOP HEAD AND STEM GUIDE ASSEMBLY FOR COKING DRUMS

BACKGROUND OF INVENTION

This invention pertains to an automated top head and stem guide assembly for vertical vessels such as coking drums. It pertains particularly to an automated removable top head cover unit used in combination with a removable stem guide unit, and to a method for remote removal and replacement operation for these units attached onto the vessel top head flanged opening.

During operation of delayed coking drums for the coking of various heavy hydrocarbon materials in petroleum refinery operations, the resulting coke is deposited progressively on the inner walls of the drum and when full must be periodically removed, usually at 36-48 hour intervals. A typical decoking apparatus for such coking drums is disclosed by U.S. Pat. No. 4,611,613 to Kaplan. Such coke removal from coking drums is accomplished through an opening in the lower end of the vertically-oriented drum, after the coke is cut away hydraulically by a device inserted through an opening in the coking drum top head. Removal of the large top head cover to permit inserting the cutting device is usually accomplished manually by using hoisting equipment. However, because the coking drum operates at relatively high temperatures of 500-900 degrees F., such removal of the hot coking drum top cover by manual means is slow and somewhat hazardous, and is therefore undesirable.

Various mechanical unheading devices for large containers have been disclosed in the prior art. For example, U.S. Pat. No. 3,751,854 to Huwyler et al discloses a lifting and swing mechanism for a crucible type furnace. Also, U.S. Pat. No. 3,944,472 to Lowe discloses a pivotable device for removing top lids of coke ovens. However, these prior art devices have been found to have serious deficiencies when applied to unheading the top heads of coking drums. Such deficiencies have now been advantageously overcome by the present invention.

SUMMARY OF INVENTION

This invention provides an automated top head and stem guide assembly which is adapted for remotely operated pivotal removal and replacement of a cover unit from on top of a vertically oriented vessel such as a coking drum. The invention includes a flanged connector unit which is attachable onto the vessel top flanged opening, a top head cover device, and an automated stem guide device which are each pivotally attachable to the flanged connector unit, which flanged connector unit is attached pressure-tightly to a top flange of the vessel such as with a coking drum. The invention also provides a method for remotely removing the top head cover unit attached of a coking drum vessel and replacing it with a pivotable stem guide unit attached onto the top flanged opening of the coking drum.

The top head cover device consists of a flanged connector unit which is attachable pressure tightly onto the top flange of the vessel, a cover unit which is pivotally attached to the flanged connector unit at one side of the flanged connector unit, and a transverse beam unit pivotally attached onto the cover unit upper side and movably attached at each end onto dual threaded screws pivotally connected onto the flanged connector unit. The transverse beam unit is vertically movable on said dual threaded jack screws by an actuator motor and gear box means.

The stem guide device is also pivotally attached flanged connector unit at a location substantially opposite that of the top head cover unit pivotal attachment. The stem guide unit includes a lower base plate member having a central opening therein and dual horizontally movable clamping parts which are pivotally attached to the upper side of the lower base plate. The stem guide unit is operated by a pivotable piston actuator means adapted for raising and lowering the stem guide unit relative to the flanged connector unit. Operation of the pivotable top head cover unit is synchronized with operation of the pivotable stem guide unit, so that the vessel top head cover unit is first pivotally moved upwardly and to one side, after which a coke removal stem member is inserted into the vessel, and the pivotable stem guide unit is pivotally lowered onto the upper flanged opening of the flanged connector unit so as to guide the stem member during coke removal from the coking drum. Following such use of the stem guide unit, it is pivotally moved upwardly to its initial position, and the stem member is removed, the top head cover unit is pivotally moved downwardly and then repositioned onto the vessel top flanged connector unit, and pressure-tightly connected onto the flanged connector unit.

Accordingly, this invention advantageously provides an improved top head cover unit and stem guide assembly for vertical vessels such as coking drums. The assembly is adapted for providing remote safe and reliable removal and replacement of a coking drum top head cover for more convenient and rapid removal of coke deposits from the drum during periodic decoking operations.

BRIEF DESCRIPTION OF DRAWINGS

This invention will be further described by reference to the following drawings, in which.

DESCRIPTION OF INVENTION

Figure 1:
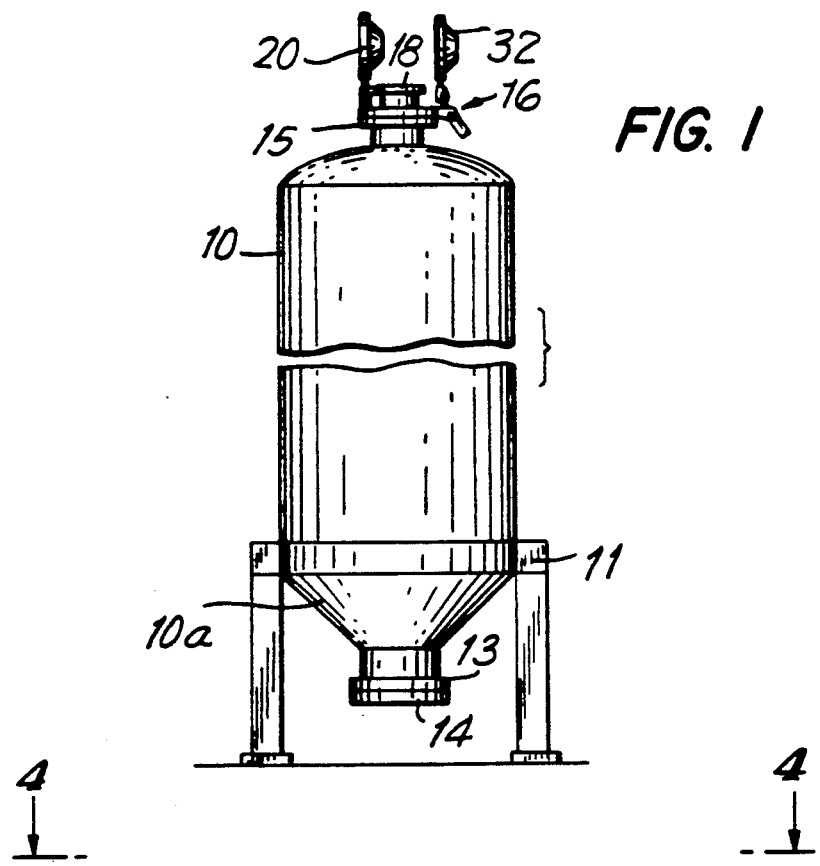
FIG. 1 shows a large vertically-oriented vessel having a top head cover unit and stem guide unit assembly which are each pivotally attached to a top flanged connector unit, which is attached pressure-tightly onto the vessel.

As is generally shown by the FIG. 1 drawing, a vertically oriented delayed coking drum vessel 10 is supported by a suitable support structure 11. Such delayed coking drums 10 for use in petroleum refineries are usually 15-25 ft. diameter and 50-100 ft. tall, and have a conical shaped lower portion 10a which extends to a lower flanged opening 13. A movable lower cover unit 14 is pressure-tightly and removably attached to the lower flange 13. The coke material deposited progressively on the walls of the coking drum 10 during coking operations is removed from the drum periodically as needed by first removing the lower flange cover unit 14, removing a top head cover assembly 16, and then hydraulically cutting the deposited coke from within the vessel. The coke falls through the lower flanged opening 13 and a chute into a railcar or storage pit (not shown) for further use as desired.

Figure 2:
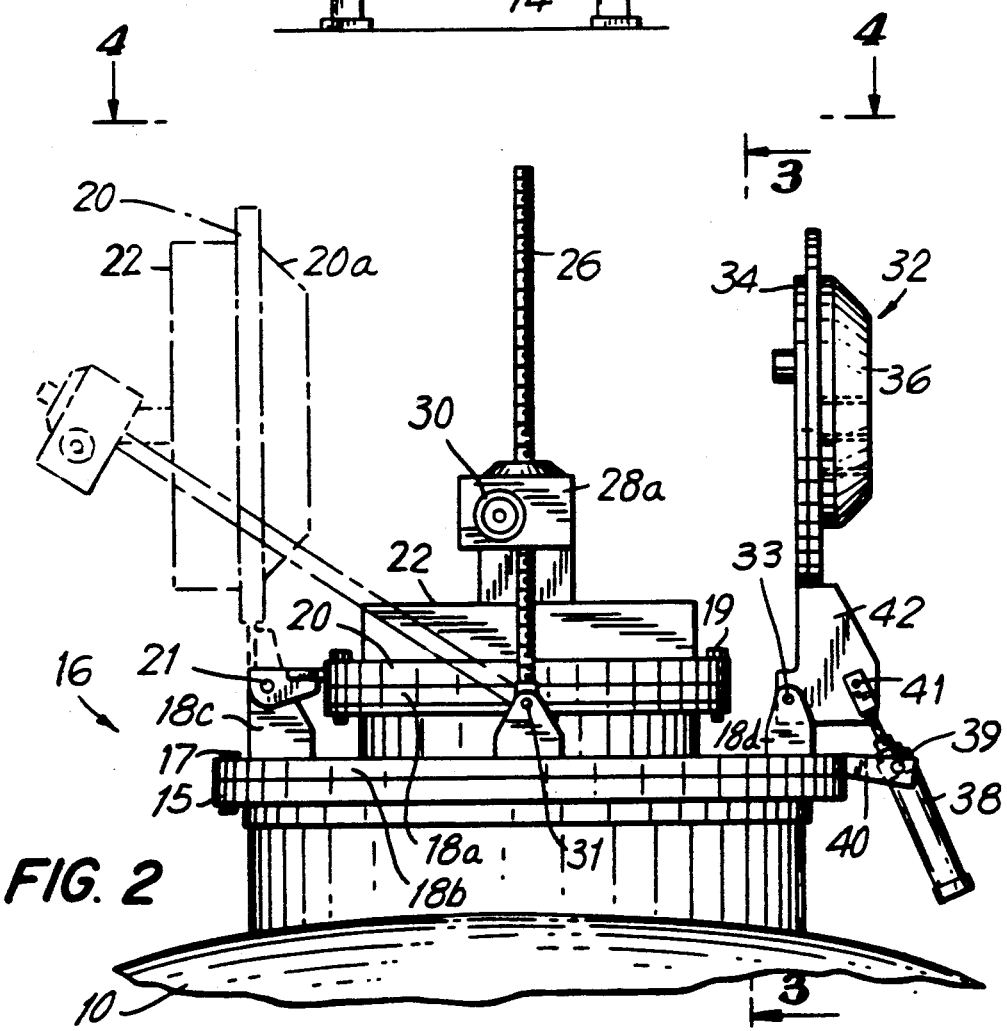
FIG. 2 shows a vertical elevation view of the vessel, including the top head cover unit shown in closed position and the stem guide unit assembly shown in open position.
Figure 3:
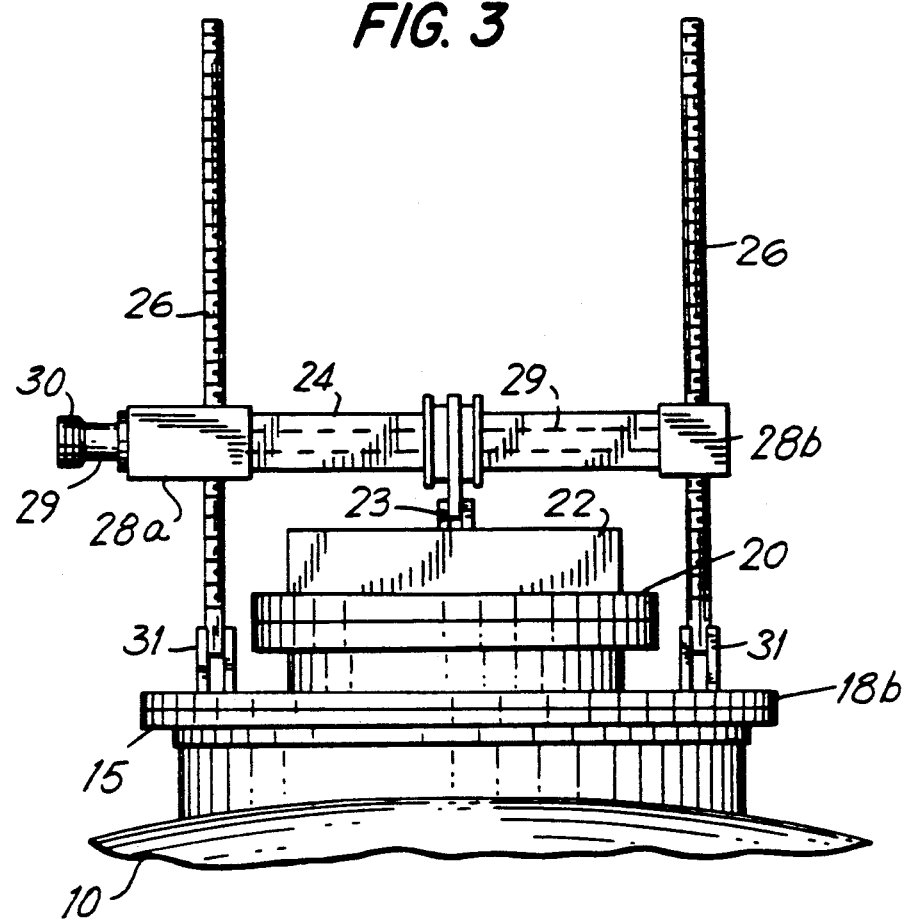
FIG. 3 shows an alternative elevation view of the top head cover unit as viewed from line 3—3 of FIG. 2.

The coking drum 10 has an upper head flange 15, and a top head assembly 16 which is pressure-tightly and removably attached to the upper flange 15 by a plurality of fasteners such as bolts 17. As shown by FIGS. 2 and 3, the top head assembly 16 included a top flanged connector unit 18, which further includes a conduit portion having a bore extending axially therethrough. The connector unit is attached to the top head flange 15 by a plurality of bolts 17. Upper flange plate 18a of connector unit 18 usually has its outer diameter smaller than that of lower flange plate 18b, however, the upper flange outer diameter can be made substantially equal to or larger than that of lower flange 18b.

A top head cover unit 20, which has a thermal insulation layer 20a provided on its lower side, is attached to upper flange 18a of connector unit 18 by a plurality of bolts 19. Cover unit 20 is pivotally attached at 21 onto a support bracket 18c, which is rigidly attached onto the lower flange 18b of the flanged connector unit 18. After removing bolts 19, the top head cover unit 20 is movable upwardly from a first lower position in contact with upper flange 18a of connector unit 18 to a second upper position by means of a lifting mechanism. As best seen in FIG. 3, this cover lifting mechanism includes a transverse beam structure 22, which is rigidly attached onto the upper side of the top head cover unit 20. Beam structure 22 is also pivotally attached at a central point 23 to a transverse movable beam unit 24. The beam unit is vertically movable on dual jack screws 26 by motor drive mechanism 28, which includes dual gear units 28a and 28b located at each end of the beam unit 24 and threadably connected about the jack screws 26. These dual gear units are driven by hydraulic motor 30, which is mounted on gear box 28a and drives the gears through a connecting shaft 29 and suitable couplings.

Figure 4:
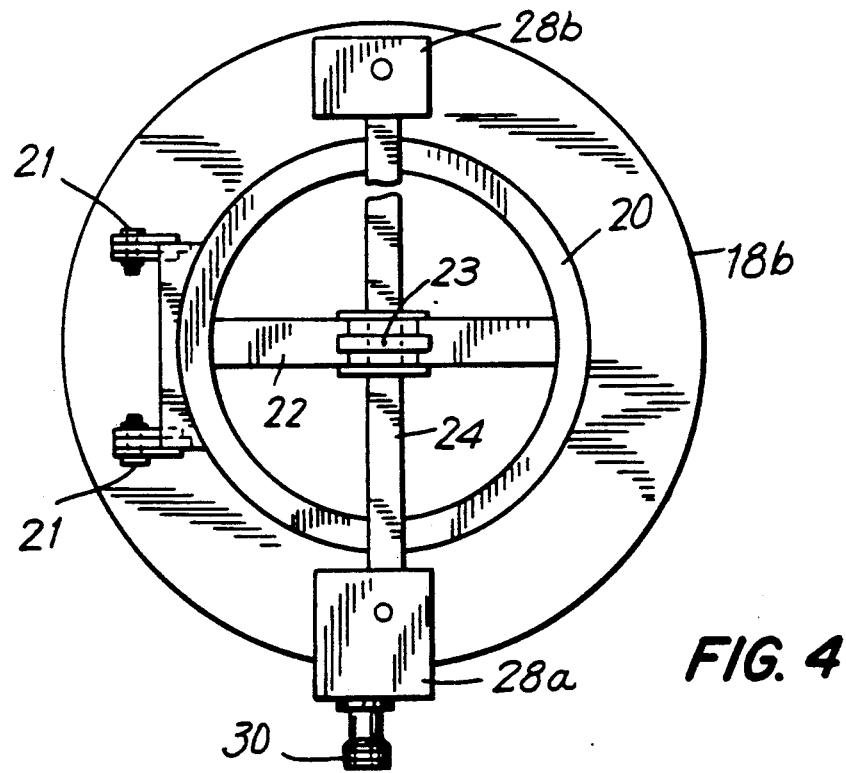
FIG. 4 shows a plan view of the top head cover unit taken at line 4—4 of FIG. 2.

The lower ends of the jack screws 26 are pivotally attached at 31 to the lower flange 18b of the flanged connector unit 18. By this arrangement, when the hydraulic motor 30 is actuated, it rotates the dual gear units 28a and 28b so as to lift beam 24 and head cover unit 20 upwardly on the dual jack screws 26 to a second upper position. During such lifting, jack screws 26 together with head cover unit 20 will pivot at their respective pivot points 31 and 21 relative to flanged connector unit 18 to its second upper position, as shown by the phantom lines in FIG. 2. The top cover unit 20 and the beam structure 24 are also shown in a closed position in plan view by FIG. 4.

Figure 5:
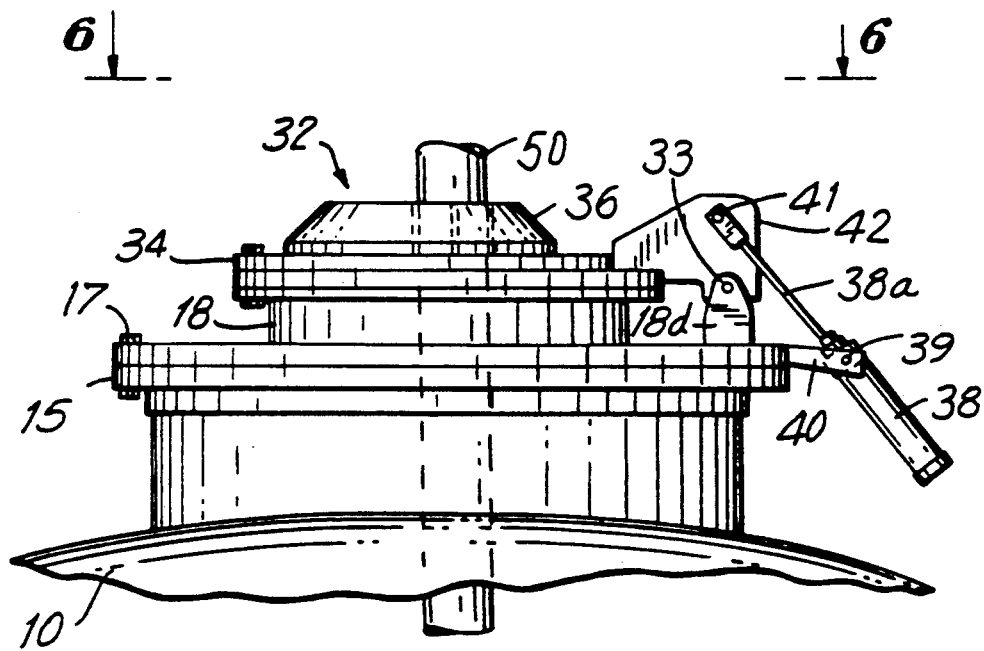
FIG. 5 shows an elevation view of the stem guide unit pivotally attached onto the vessel top flanged unit with the guide plate shown in its closed position.
Figure 6:
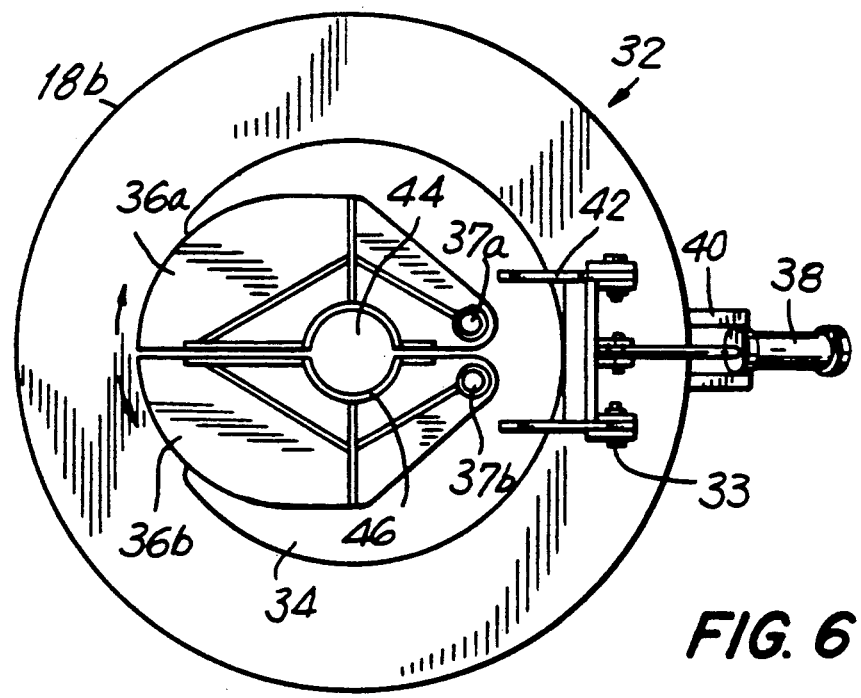
FIG. 6 shows a plan view of the stem guide unit, including the dual horizontally movable clamp members, taken at line 6—6 of FIG. 5.

After the head cover unit 20 is pivotally removed upwardly above the flanged connector unit 18, it is replaced by stem guide unit 32, which is shown in an upright open position in FIG. 2, and is shown in a closed position onto flanged unit 18 in FIG. 5. This stem guide unit 32 is pivotally attached at 33 onto bracket 18d of flange connector unit 18, and includes a base plate member 34 and a dual horizontally movable clamping parts 36 located above and pivotally attached to the base plate member 34. The clamping parts 36a and 36b are each pivotally attached at 37a and 37b respectively to the base plate member 34, so that the clamping parts are horizontally movable relative to each other and are also horizontally movable relative to the base plate member 34, as is further shown by FIG. 6.

The stem guide unit 32 is pivotally actuated by a hydraulic piston actuator 38, the body of which is pivotally attached at 39 to the connector unit lower flange 18b by a lower bracket 40. The piston rod 38a of actuator 38 is also pivotally attached at 41 to an upper bracket 42, which is rigidly attached to base member 34 of stem guide unit 32. By this configuration, whenever the rod 38a of piston actuator 38 is extended upwardly, the stem guide unit 32 can be pivotally lowered onto the upper flanged opening of the flanged connector unit 18. However, before the stem guide unit 32 is pivotally lowered onto the flanged connector unit 18, a coke removal stem member 50 is first inserted vertically through the bore in the flanged unit 18 and into the coking drum vessel 10 to facilitate removal of coke from the vessel. The stem guide unit 32 is then lowered into the connector position onto unit 18, so that dual pivotable clamping parts 36a and 36b are closed about the stem member 50, and serve to guide the stem member within a central opening 44 and split guide 46 of guide unit 32.

After such coke removal from the vessel 10, the dual clamping parts 36a and 36b and split guide bushing 46 are opened from around the stem member 50, and the stem guide unit 32 is pivoted upwardly to a substantially upright position by actuator 38. Then the stem member 50 is removed from the vessel 10. When it is desired to return head cover unit 20 to its original lowered position on flanged connector unit 18, the operation of hydraulic motor 30 is reversed so that the head cover unit 20 is lowered on the dual jack screws 26 while cover unit 20 is simultaneously pivoted at its pivot 21. After the cover unit 20 is lowered into position on flanged unit 18, the bolt fasteners 19 are replaced so that the coking vessel 10 can be repressurized for further operation.

The correct sequence of operations, by which the head cover unit 20 is pivotally raised and lowered from flange connector unit 18 by beam unit 24 and the stem guide unit 32 is pivotally raised and lowered by piston actuator 38, is controlled by an interlock system (not shown). This interlock system is connected both electrically and hydraulically by known switching means to actuator motor 30 of beam unit 24, and also is connected to control valves (not shown) for actuator piston 38, so as to prevent any interference between the pivotal movements of the head cover unit 20 and stem guide unit 32.

This invention will be further described by the following example of operations, which should not be construed as limiting the scope of the invention.

EXAMPLE 1

A large vertically oriented coking drum is equipped with an automated top head cover device. This device includes a flanged connector unit which has its lower flange bolted onto the top flange opening of the coking drum.

Also, a top cover unit is pivotally attached to flanged connector unit lower flange, so as to cover the opening in the connector unit upper flange. A lifting mechanism is pivotally attached to the cover unit upper side, which mechanism is in the form of a transverse beam connected to dual jack screws which are pivotally attached onto the lower flange of the connector unit. The transverse beam is operated by a hydraulic motor which drives dual gear boxes which engage the jack screws. A source of pressurized hydraulic fluid is connected to the motor by flexible hoses extending from the fluid source. Thus, whenever it is desired to raise the top cover to a pivoted upright position, the drive motor is actuated so that the cover unit is lifted and simultaneously pivoted to the upright position.

Important construction parameters for the top head cover device are provided below:

| Vessel top flange diameter, in, | 48 |
| --- | --- |
| Connector conduit top flange diameter, in. | 30 |
| Cover unit diameter, in. | 36 |
| Jack screw length, in. | 60 |
| Transverse beam unit length, in. | 50 |

EXAMPLE 2

The coking drum described in Example 1 is also provided with a stem guide device, which includes a stem guide unit which is also pivotally attached to the lower flange of the flanged connector unit at a location diametrically opposite the pivotal attachment point for the top cover unit. The stem guide unit is actuated by a hydraulic piston actuator which has its body member pivotally attached at its upper end to the connector unit lower flange, and has its piston rod pivotally attached to the stem guide unit. The piston actuator is operated by a pressurized hydraulic fluid provided through flexible hoses from a suitable fluid source.

By this arrangement, the stem guide unit which is originally in an upright position is pivotally lowered down onto the top flange of the flanged connector unit around a elongated stem member which was previously inserted through the flanged connector unit into the coking vessel. Then the dual horizontally movable clamps are pivoted to their closed position, so as to guide the vertical stem member during its operation. Following coke removal from the vessel, the stem guide unit is pivotally raised to an upright position, and the stem member is removed from the vessel.

Important parameters for the stem guide device are tabulated below:

| Guide unit outer diameter, in. | 36 |
| --- | --- |
| Sector angle for guide unit opening, deg. | 45 |
| Offguide unit clamps, opening diam. in. | 8 |

Although this invention has been described broadly and in terms of a preferred embodiment, it will be understood that modification and variations can be made to the invention which is defined by the following claims.

What is claimed:

1. A top head cover apparatus for attachment onto a vertical vessel having a top end flange, said cover apparatus comprising:
   (a) a flanged connector unit having a lower flange plate and an upper flange plate which are separated by a cylindrical shaped connecting conduit, said unit having a bore extending axially therethrough, said lower flange plate being attachable pressure-tightly onto a top end flange of a vessel;
   (b) a top cover unit pivotally attached onto said flanged connector unit at a first location, said top cover unit being pivotable from a first lower position adjacent to said upper flange plate to a second upper position: and
   (c) a lifting mechanism pivotally attached at a lower end onto said flanged connector unit at a second location, and attached at an upper end to the upper side of said cover unit, whereby said cover unit can be lifted from the first lower position to the second upper position so as to provide access to the bore of said flanged connector unit.

2. A top head cover apparatus as claimed in claim 1, wherein said lifting mechanism comprises a transverse beam pivotally attached to the upper side of said top unit, said transverse beam having first and second ends, and a jack screw attached to each of said ends of the beam, each said jack screw having a lower end pivotally attached to said lower flanged plate; and an actuator motor drive means attached to the transverse beam and engaging each said jack screw whereby said top cover unit can be raised to the second upper position relative to said flanged connector unit, and then lowered to engage said upper flange plate by operation of the actuator motor drive means.

3. A top head cover apparatus as claimed in claim 1, further comprising a stem guide device pivotally attached to said lower flange plate at a location substantially diametrically opposite the first location for pivotal attachment of said top cover unit and a stem guide device actuator means for lowering said stem guide device to cover the bore whenever said head cover unit is raised to the second position.

4. A top cover apparatus as in claim 3, wherein said stem guide device actuator means is pivotally attached at one end to said lower flange plate and is pivotally attached at its outer end to said stem guide device, whereby said guide device can be pivotally lowered by said stem guide device actuator means from a substantially upright position to a substantially horizontal position to cover the bore of said flanged connector unit, and then pivotally raised again to the substantially upright position.

5. A top cover apparatus as in claim 4, wherein said stem guide device actuator means is a hydraulic piston type actuator having a body member pivotally attached to said lower flange plate and having the piston at its upper end pivotally attached to the stem guide device.

6. A top head cover device for pivotal removal and replacement of a head cover unit onto an upper flanged connector unit attached onto a vertical vessel, comprising:
   (a) a flanged connector unit having a lower flange plate and an upper flange plate which are separated by a cylindrical-shaped connecting conduit, said unit having a bore extending axially therethrough, said lower flange plate being attachable pressure-tightly onto a top flange of a vessel;
   (b) a top head cover unit pivotally attached onto said lower flanged plate at a first location, said head cover unit being attachable pressure-tightly onto said upper flange plate and being pivotable from a first lower position to a second upper position; and
   (c) a lifting mechanism including dual jack screws and a transverse beam which is pivotally attached to the upper side of said head cover unit and is movably attached at opposite ends to one of the jack screws, each said jack screw having a lower end pivotally attached to said lower flange plate;

actuator motor drive means attached to the transverse beam for raising the top head cover unit from the first lower position to the second upper position relative to said flanged connector unit, and then lowered to engage said upper flange plate by operation of the actuator motor drive means of said transverse beam.

7. The top head cover device of claim 6, wherein said head cover unit is pivotally attached to said transverse beam at a central point of the cover unit.

8. The top head cover device of claim 6, including a stem guide device pivotally attached to said lower flange plate at a location substantially diametrically opposite said first location, means for pivotally moving said stem guide device so as to cover the bore after said head cover unit is raised to the second position.

9. A stem guide device for attachment onto a top flange of a vertical vessel for closing a top flanged opening of the vessel, said device comprising:
  (a) a flanged connector unit having a lower flange plate and an upper flange plate which are separated by a cylindrical-shaped connecting conduit, said unit having an axial bore extending therethrough said lower flange plate being attached pressure-tightly onto a top flange of a vessel;
  (b) a stem guide unit pivotally attached onto said lower flange plate, said stem guide unit being sized so as to cover the bore extending through said connector unit, and includes a lower base plate member having a central opening therein, and including dual horizontally movable clamping parts pivotally attached to the upper side of said lower base plate member; and
  (c) piston actuator means pivotally attached at one end to said lower flange plate and pivotally attached at its other end to said lower base plate member of said stem guide unit, whereby said stem guide unit can be pivotally lowered by said actuator means from a substantially upright position to a substantially horizontal position to cover the bore extending through said connector unit and then pivotally raised again to the substantially upright position.

10. The stem guide device of claim 9, wherein said actuator means is a hydraulic piston type actuator having a body member pivotally attached at its upper end to said lower flange plate and having the piston upper end pivotally attached to the lower base plate member of said stem guide unit.

11. The stem guide device of claim 9, wherein said stem guide unit lower base plate member has a central sector-shaped opening therein, and said dual horizontally movable clamping parts are attached so as to be opened to a position at least as wide as the sector-shaped opening and provide a central opening for enclosing and guiding a stem member inserted into the vessel.

12. A top head and stem guide assembly for alternately opening and closing a top head opening in a vertically-oriented vessel, said assembly comprising:
  (a) a flanged connector unit having a lower flange plate and an upper flange plate separated by a cylindrical-shaped connecting conduit provided therebetween, said unit having an axial bore extending therethrough, said lower flange plate being attachable pressure-tightly onto a top flange of the vessel;
  (b) a top head cover unit pivotally attached onto said lower flange plate at a first location and pivotable from a first lower position to a second upper position;
  (c) a lifting means pivotally attached at a lower end to said lower flange plate at a second location and pivotally attached to its upper end to the upper side of said cover unit, said lifting means including dual jack screws and a transverse beam unit movably attached to the dual jack screws, each of said jack screws pivotally attached at a lower end to said lower flange plate, and actuator motor drive means attached to the transverse beam unit for vertically moving the transverse beam unit on the dual jack screws, and
  (d) a stem guide unit pivotally attached onto said lower flange plate at a location substantially diametrically opposite the first attachment location of said head cover unit, said stem guide unit including a lower base plate member having a central opening therein and dual horizontally movable clamping parts pivotally attached to said lower base plate member; piston actuator means for pivotally moving said stem guide unit relative to said flanged connector unit; whereby said head cover unit can be pivotally raised to a substantially upright position, and said stem guide unit can be pivotally lowered from a substantially upright position to cover the bore extending through said connector unit.

* * * * *